Isaac Showalter's Comb'd Self adjusting Cart and Brake.

PATENTED JUL 18 1871

No. 117213

Witnesses:
Victor Hagmann
A. Rawlings

Inventor:
Isaac Showalter
By Hill & Ellsworth
attys.

UNITED STATES PATENT OFFICE.

ISAAC SHOWALTER, OF CHESTER COUNTY, PENNSYLVANIA.

IMPROVEMENT IN SELF-ADJUSTING CARTS AND BRAKES.

Specification forming part of Letters Patent No. 117,213, dated July 18, 1871; antedated July 15, 1871.

*To all whom it may concern:*

Be it known that I, ISAAC SHOWALTER, of Chester county, in the State of Pennsylvania, have invented certain Improvements in Combined Self-Adjusting Carts and Brakes; and I do hereby declare the following to be a full, clear, and exact description thereof, reference being had to the accompanying drawing, in which—

Figure 1:
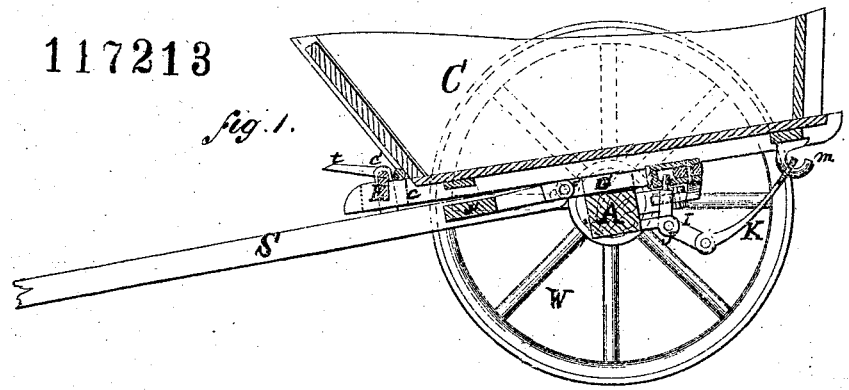
Figure 2:
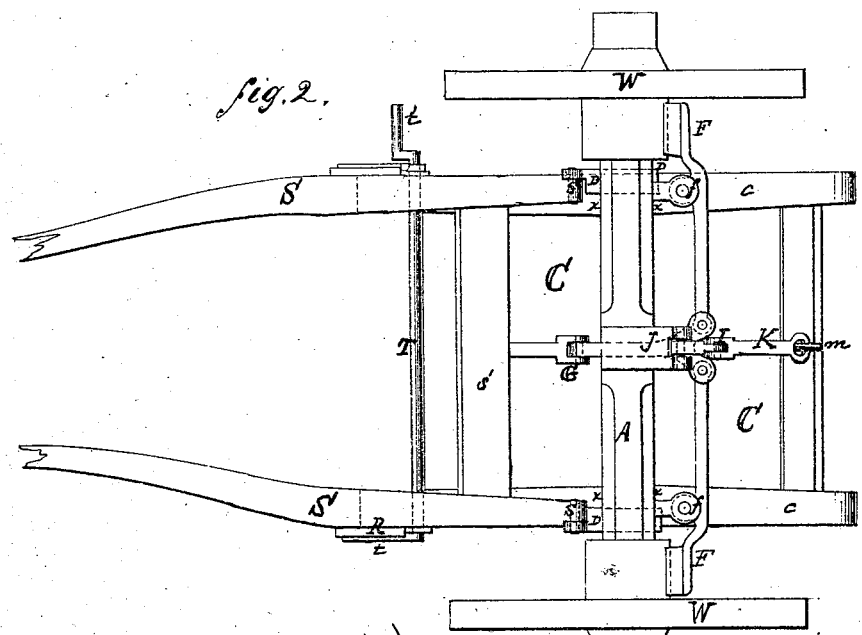
Figure 3:
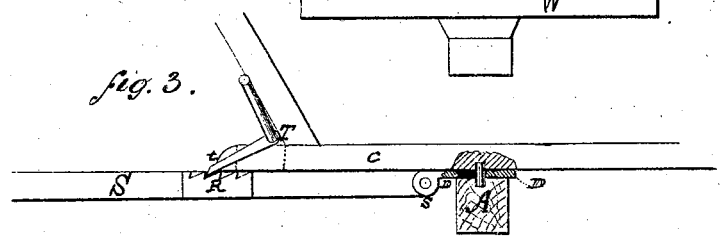

Figure 1 is a longitudinal vertical section, Fig. 2 is a bottom view, and Fig. 3 is a view of the locking device detached.

Similar letters of reference indicate like parts.

The object of this invention is to prevent the load from bearing heavily down upon the shafts when descending an incline, and also, at the same time, to provide the cart with automatic brakes. To this end the cart is constructed with shafts adapted to slide longitudinally to a limited extent, and so attached to the brake-levers that, when the team holds back, the backward sliding of the shafts applies the brakes to the wheels. In addition to this, the sliding shafts are connected to the rear end of the cart-body by a rod or chain in such a manner that when the shafts slide backward, as in descending a hill, they will tilt down the rear end of the cart and raise the weight of its forward end off of the shafts, thereby preventing them from dragging down upon the team. The invention consists: 1st, in so constructing the cart that the forward end of the load will thus be automatically lifted from the shafts in going down hill; and 2d, in combining an automatic brake or brakes with the apparatus employed to tilt the cart-body.

In the drawing, W W are the wheels; A, the axle; C, the cart-body, resting upon and firmly attached to the axle near the points $x\ x$; and S S, the shafts, which extend under the cart nearly back to the axle, and at their rear end are articulated at $s\ s$ to metallic plates D D that rest upon the upper side of the axle under the edge of the cart-body, and are capable of sliding longitudinally to the extent of a few inches. The lower side pieces $c\ c$ of the frame of the cart-body project beyond the body in front, and are there vertically slotted to receive a stud, $c'$, projecting up from the shafts for the purpose of limiting their sliding movement, and also of holding the ends of a bar, E, that fasten the front end of the cart down, leaving the latter, however, a little vertical play, for the purposes hereinafter set forth. F F are the brakes, supported behind the axle upon fulcrums $f\ f$ projecting therefrom, and operated by a jointed rod or bar, G, connected to the sliding shafts by means of a cross-bar, $s'$, which unites them near their rear end. The whole construction is such that as the cart presses forward upon the team in descending an incline the shafts will be forced back and will apply the brakes and relieve the draft-horses. Near its rear end the sliding bar G is connected to a bent lever, I, the fulcrum of which is an iron plate, J, projecting back from the under side of the axle, and the lower end of the lever is connected, by means of a rod or chain, K, to a hook or bolt, $m$, near the rear end of the cart-body, so that whenever in descending a hill the sliding of the shaft operates the brakes, it will also cause the lever I to draw down the rear end of the cart-body, tilting the latter slightly upon the axle and raising the forward portion of the load off of the shafts, thereby relieving the horses of all downward pressure therefrom. Of course, it is not necessary that the cart should tilt much to accomplish this, and the extent of its movement is limited by the length of the studs $c'\ c'$ that hold the bar E.

Inasmuch as it is often desirable to back a cart on level ground, and the brakes ought not to be applied during such operation, I provide a simple apparatus for locking the shafts, when necessary, so as to prevent their sliding back, and, consequently, prevent the operation of the brakes and tilting device whenever the driver wishes to do so. This lock consists of a ratchet-plate, R, attached to the side of the shafts; a rock-bar, T, supported upon the projecting ends of the side beams $c\ c$ and having a toe, $t$, which catches upon the ratchet-plate; and a handle, crank, or treadle, $t'$, operated by hand or foot, by which to turn the bar and engage or disengage the toe. When the toe is engaged with the ratchet the shafts cannot slide back and the brakes and tilting apparatus cannot act.

It is evident that the tilting device may be applied to an ox-cart having a tongue instead of shafts; either the tongue being made to slide or being connected with a sliding rod to be actuated by the holding back of the team. It may also be applied to a one-horse chaise, or any other vehicle which from its construction is liable to bear heavily down upon the shafts or tongue in descending an incline.

Having thus described my invention, what I claim as new, and desire to secure by Letters Patent, is—

1. The combination of a tilting cart-body with a connecting device, K I G S S, or its equivalent, extending under the cart-body from the rear end thereof to the yoke or harness of the team, substantially as described, and for the purposes specified.

2. The combination of the sliding plates D D, the shafts S' S' hinged to the plates, the sliding bar G, the lever I, and the rod or chain K, substantially as and for the purpose set forth.

3. The combination of a cart-brake, F, and a tilting-rod, K, operating as described, with a single sliding bar, G, whereby both brake and rod are operated at the same time by the same force, substantially as described.

4. The locking device R T $t$ $t'$, when combined with the sliding shafts, the automatic brakes, and the automatic tilting apparatus, substantially as described, for the purpose set forth.

ISAAC SHOWALTER.

Witnesses:
L. HILL,
E. A. ELLSWORTH.